United States Patent
Hosono

(10) Patent No.: US 7,490,130 B2
(45) Date of Patent: Feb. 10, 2009

(54) ELECTRONIC MAIL CREATING APPARATUS AND METHOD OF THE SAME, PORTABLE TERMINAL, AND COMPUTER PROGRAM PRODUCT FOR ELECTRONIC MAIL CREATING APPARATUS

(75) Inventor: Shizu Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 678 days.

(21) Appl. No.: 11/088,997

(22) Filed: Mar. 24, 2005

(65) Prior Publication Data
US 2005/0223071 A1    Oct. 6, 2005

(30) Foreign Application Priority Data
Mar. 31, 2004    (JP)    ............... 2004-101824

(51) Int. Cl.
G06F 15/16    (2006.01)
H04Q 7/20    (2006.01)
G06F 7/00    (2006.01)

(52) U.S. Cl. ................ 709/206; 709/207; 455/466; 707/10

(58) Field of Classification Search ........... 709/206, 709/207; 455/477; 707/10
See application file for complete search history.

(56) References Cited

U.S. PATENT DOCUMENTS

| | | | | |
|---|---|---|---|---|
| 5,325,297 A | * | 6/1994 | Bird et al. ............... | 715/201 |
| 5,805,784 A | * | 9/1998 | Crawford ................. | 345/473 |
| 5,995,597 A | * | 11/1999 | Woltz et al. ............. | 379/93.24 |
| 6,216,165 B1 | * | 4/2001 | Woltz et al. ............. | 709/232 |
| 6,567,104 B1 | * | 5/2003 | Andrew et al. ........... | 715/762 |
| 7,162,197 B2 | * | 1/2007 | Kitamura ................. | 434/317 |
| 7,315,613 B2 | * | 1/2008 | Kleindienst et al. ...... | 379/88.13 |
| 2002/0026360 A1 | * | 2/2002 | McGregor et al. ........ | 705/14 |
| 2003/0017844 A1 | * | 1/2003 | Yu .......................... | 455/556 |
| 2003/0220835 A1 | * | 11/2003 | Barnes, Jr. .............. | 705/14 |
| 2004/0019487 A1 | * | 1/2004 | Kleindienst et al. ...... | 704/270.1 |

FOREIGN PATENT DOCUMENTS

JP    2001-306467    11/2001

* cited by examiner

Primary Examiner—Ario Etienne
Assistant Examiner—Sargon N Nano
(74) Attorney, Agent, or Firm—McGinn IP Law Group, PLLC

(57) ABSTRACT

An e-mail creating apparatus which creates a message of an e-mail, includes a searcher which refers to a library which stores a content and a keyword representing the content in a state where the content and the keyword are associated with each other, and searches, in the library, a specific content associated with the keyword corresponding to at least a part of a character string comprising an inputted body text of the message and an adder which adds the specific content searched by the searcher to the body text of the message.

26 Claims, 7 Drawing Sheets

ELECTRONIC MAIL CREATING APPARATUS AND METHOD OF THE SAME, PORTABLE TERMINAL, AND COMPUTER PROGRAM PRODUCT FOR ELECTRONIC MAIL CREATING APPARATUS

BACKGROUND OF THE INVENTION

1. Field of the Invention

The present invention relates to an electronic mail creating apparatus and method suitably applied to a portable terminal and an information processing device.

2. Description of the Related Art

On a cellular phone which is a typical portable terminal, not only an essential call function but also a function to transmit/receive an electronic mail (hereinafter referred to as e-mail) (so-called a mailer function) are provided. Transmission/reception of e-mails using the cellular phone has been widely spread among a large number of users. Accompanied with the proliferation of the mailer function, the users want to send a unique and amusing e-mail.

Accordingly, in recent years, a mailer function capable of not only transmitting/receiving a message (a character string) but also transmitting/receiving a message to which image data is added has been proposed (See pages 3 and 4 and FIGS. 1 to 3 in Japanese Patent Laid-Open 2001-306467).

However, in the conventional mailer function, in order to transmit an image together with the created message, users have to perform operations including an operation for selecting objective image data and an operation for attaching the selected image data to the message. Therefore, there has been a problem that these operations are complicated for the users and the usability is not good. In particular, this problem becomes worse in a portable terminal such as a cellular phone in which an enter operation is restricted because of the poor operability of its manipulation device due to a small size of its case.

Accordingly, in creating an e-mail message, there is a need for simpler input operations to enter letters and contents (image data, music data and the like).

In general, with respect to the mailer function in the portable terminal, an upper-limit data size (the maximum capacity) of a message, with which the message can be transmitted, is determined for each server relaying the message or for each mail transmission/reception service signed up. Therefore, if the user creates a message without concern for such maximum capacity, then it may be impossible for the user to transmit the message because of the capacity of the message being too large for transmission. In this case, the users are Obliged to perform troublesome operations in order to make the data size of the message fit within the maximum capacity range for transmission, by arranging the way to express the messages or by simply abbreviating it.

SUMMARY OF THE INVENTION

The present invention was made to solve the foregoing and other exemplary problems, drawbacks, and disadvantages. A first exemplary feature of the present invention is to provide an e-mail creating apparatus and a method of the same, a portable terminal, and a computer program product for an e-mail creating apparatus, which facilitate easy creating of a unique message.

A second exemplary feature of the present invention is to provide an e-mail creating apparatus and a method of the same, a portable terminal, and a computer program for an e-mail creating apparatus, which are capable of easily performing a capacity (data size) adjustment of a created message.

The e-mail creating apparatus for achieving the above first and other exemplary features described hereinbefore is characterized by the following constitution.

Specifically, an e-mail creating apparatus which creates a message of an e-mail includes:

a searcher which refers to a library which stores a content and a keyword representing the content in a state where the content and the keyword are associated with each other, and searches, in the library, a specific content associated with the keyword corresponding to at least a part of a character string composing an inputted body text of the message; and an adder which adds the specific content searched by the searcher to the body text of the message.

Herein, the specific content is at least any one of, for example, image data, music data and text data.

In an exemplary embodiment, the searcher includes:

a first extractor which extracts a second, which is different from a first keyword as the keyword corresponding to at least a part of a character string comprising the inputted body text of the message, keyword used as a search key out of the character string composing the body text of the message by referring to a dictionary file; and a second extractor which searches the library by use of the second keyword extracted by the first extractor as a search key, thus extracting the content associated with the first keyword as the specific content to be added to the body text of the message, when the second keyword and the first keyword stored in the library are concordant with each other.

Alternatively, the searcher searches the character string composing the body text of the message by use of the first keyword stored in the library as a search key, and the searcher extracts the content corresponding to the first keyword as the specific content to be added to the body text of the message when a specific character in concordance with the first keyword is detected in the character string.

The e-mail creating apparatus which achieves the second and other exemplary features of the present invention is characterized by having the following constitution.

In the e-mail creating apparatus having the above described respective constitutions, the adder includes a deleter which deletes the specific content to be added based on a predetermined rule when a data size, in a case where the specific content searched by the searcher is added to the character string composing the body text of the message, is larger than a predetermined upper limit value.

In the above described case, when a data size including the body text of the message and the specific content to be added yet after deletion by the deleter becomes smaller than the predetermined upper limit value, the adder reads out the specific content from the library and makes up an e-mail to be transmitted by adding the read-out specific content to the body text of the message.

The above described exemplary features can be achieved also by a method corresponding to the e-mail creating apparatus having the above described respective constitution.

Also, the above described exemplary features can be achieved also by a portable terminal comprising the e-mail creating apparatus having the above described respective constitutions.

And, the above described exemplary features can be achieved also by a computer program product for realizing the e-mail creating apparatus having the above described respective constitution and the method of the same by a computer, and by a computer-readable storage medium storing the computer program.

Other exemplary features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The above and other exemplary aspects, features and advantages of the present invention will become more apparent from the following detailed description when taken in conjunction with the accompanying drawings wherein.

DETAILED DESCRIPTION OF THE EXEMPLARY EMBODIMENTS

Exemplary embodiments of the present invention will now be described in detail in accordance with the accompanying drawings.

An embodiment in which the present invention is applied to a cellular phone which is a typical portable terminal will be described with reference to the accompanying drawings below.

Figure 1:
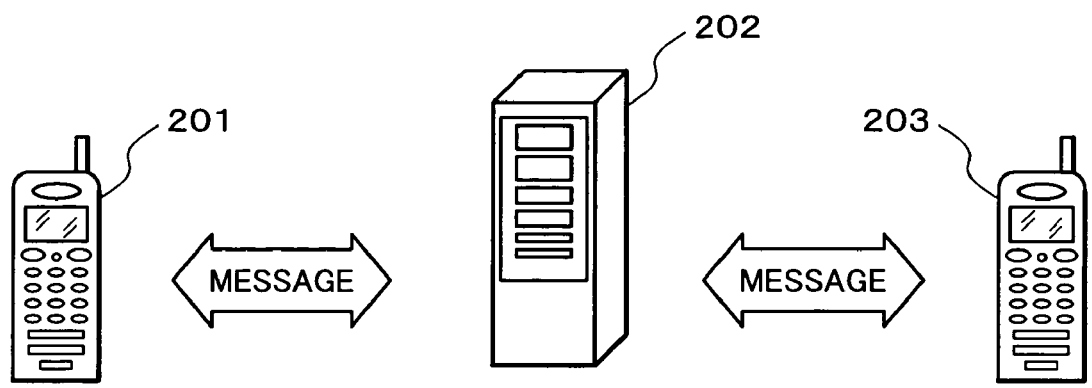
FIG. 1 is an explanatory view for explaining an e-mail transmission/reception system to which the present invention can be applied.

FIG. 1 is an explanatory view for explaining a constitution of an e-mail transmission/reception system to which the present invention is applicable. The e-mail transmission/reception system according to this embodiment comprises cellular phones 201 and 203 and a message server 202.

The cellular phones 201 and 203 are capable of creating (making up), transmitting and receiving an e-mail (hereinafter simply referred to as a mail in some cases) message. In this embodiment, not only a body text of a message composed of a character string (namely, a character code string) but also various contents such as image data and music (music composition) data can be added to the message transmitted/received as mail data. The message server 202 relays a mail (message) transmitted/received between the cellular phones 201 and 203.

Note that "music data" can be called "melody data" in the following descriptions. Furthermore, a character (text) string composing the message inputted by a user shall be called a "body text of a message" or a "body text" for convenience sake of descriptions.

In FIG. 1, a general communication network such as a public radio telephone network and Internet, which is common nowadays, is applicable to a communication line between each cellular phone and the message server 202.

Accordingly, a detailed description and an exemplification of a concrete constitution in FIG. 1 in this embodiment will be omitted.

Constitution of Cellular Phone

Figure 2:
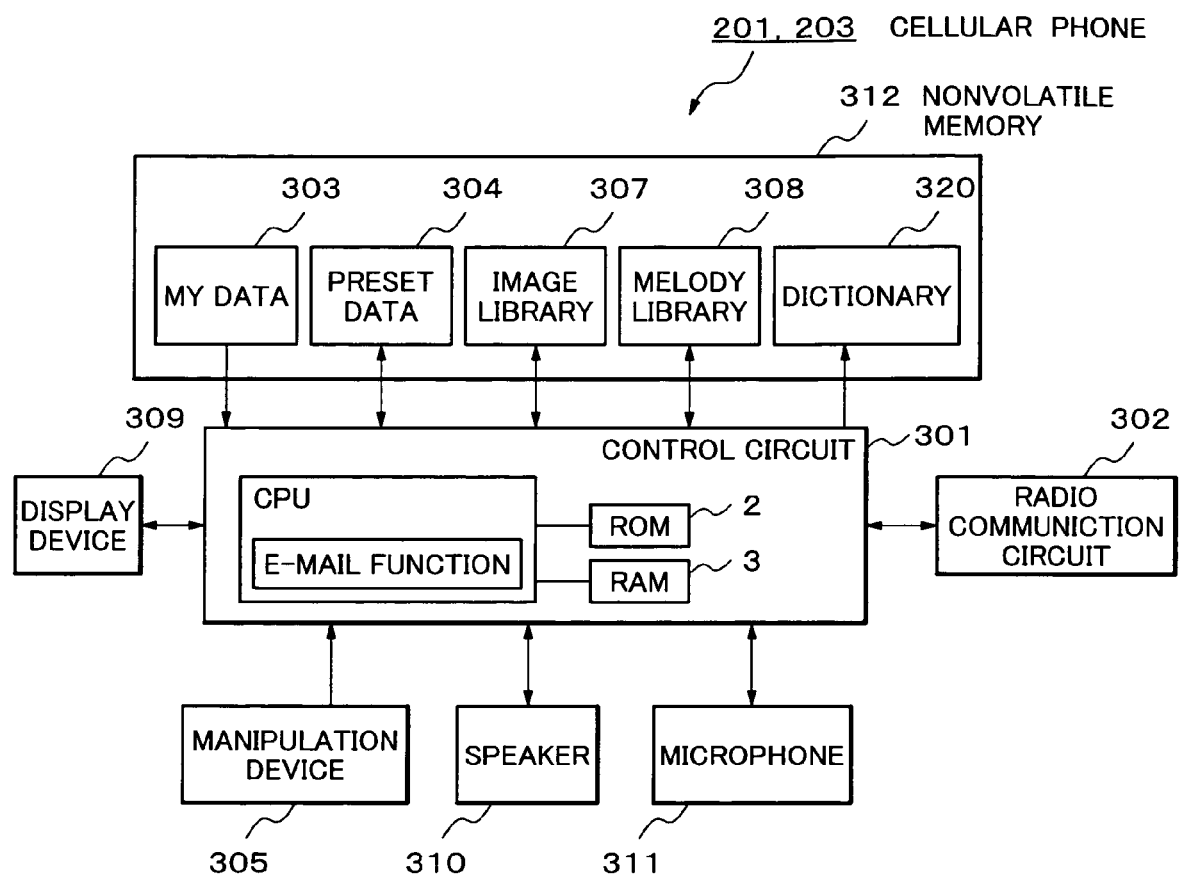
FIG. 2 is a view showing a hardware structure of a cellular phone according to this exemplary embodiment.

FIG. 2 is a block diagram showing a hardware structure of the cellular phone according to this exemplary embodiment.

In FIG. 2, each of the cellular phones 201 and 203 comprises, broadly, a control circuit 301, a radio communication circuit 302, a manipulation device 305, a display device (display) 309, a speaker 310, a microphone 311 and a nonvolatile memory 312.

Specifically, the radio communication circuit 302 communicates with an external device such as the message server 202 in accordance with an instruction of the control circuit 301. In this embodiment, general procedures can be adopted to as communication procedures performed, for communicating with the external device, by the radio communication circuit 302. Accordingly, detailed descriptions for them are omitted in this embodiment.

The manipulation device 305 is a ten key, a pointing device or the like. The manipulation device 305 is used for selecting various functions and for entering a body text of a message by the user.

The display device 309 performs displays of various screens and messages in accordance with an instruction of the control circuit 301.

The speaker 310 performs voice outputs during a telephone conversation, outputs of ringer tones, and a melody output when a mail function is being executed.

To the control circuit 301, the microphone 311 inputs a signal in accordance with voice of the user inputted by the user when a conversation function is being executed.

The nonvolatile memory 312 is a storage medium such as a flash memory, and retains various data in accordance with an instruction of the control circuit 301. In this embodiment, the nonvolatile memory 312 has a storage area therein, which is composed of my-data (user data) 303, preset data 304, an image library 307, a melody library 308 and a dictionary (dictionary file) 320.

Specifically, the my-data 303 stores a message of a mail received from a transmission object, data concerning an address book, a photographed image and the like, and data downloaded from the external device. The preset data 304 stores preset data concerning an image and a melody, which are previously prepared in the cellular phone 201. The image library 307 stores various pieces of image data prepared in a library list. And, the melody library 308 stores various pieces of melody data prepared in a library list. Note that the image library 307 and the melody library 308 will be described later with reference to FIG. 3.

The control circuit 301 comprises a CPU (Central Processing Unit) 1, a ROM (Read Only Memory) 2, a RAM (Random Access Memory) 3 and a hardware (not shown). The control circuit 301 executes various software programs, in the CPU 1 while using the RAM 3 as a work area, read out from the ROM 3 and/or the nonvolatile memory 312. Thus the control circuit 301 controls the foregoing blocks collectively. An e-mail function 306 schematically shown in the CPU 1 of FIG. 2 is one of the various software programs, and realizes characteristic processing according to this embodiment, which are described below.

Note that, in the following descriptions, the cellular phone 201 shall be a device on a mail (message) transmission side and the cellular phone 203 shall be a device on a mail reception side.

Figure 3:
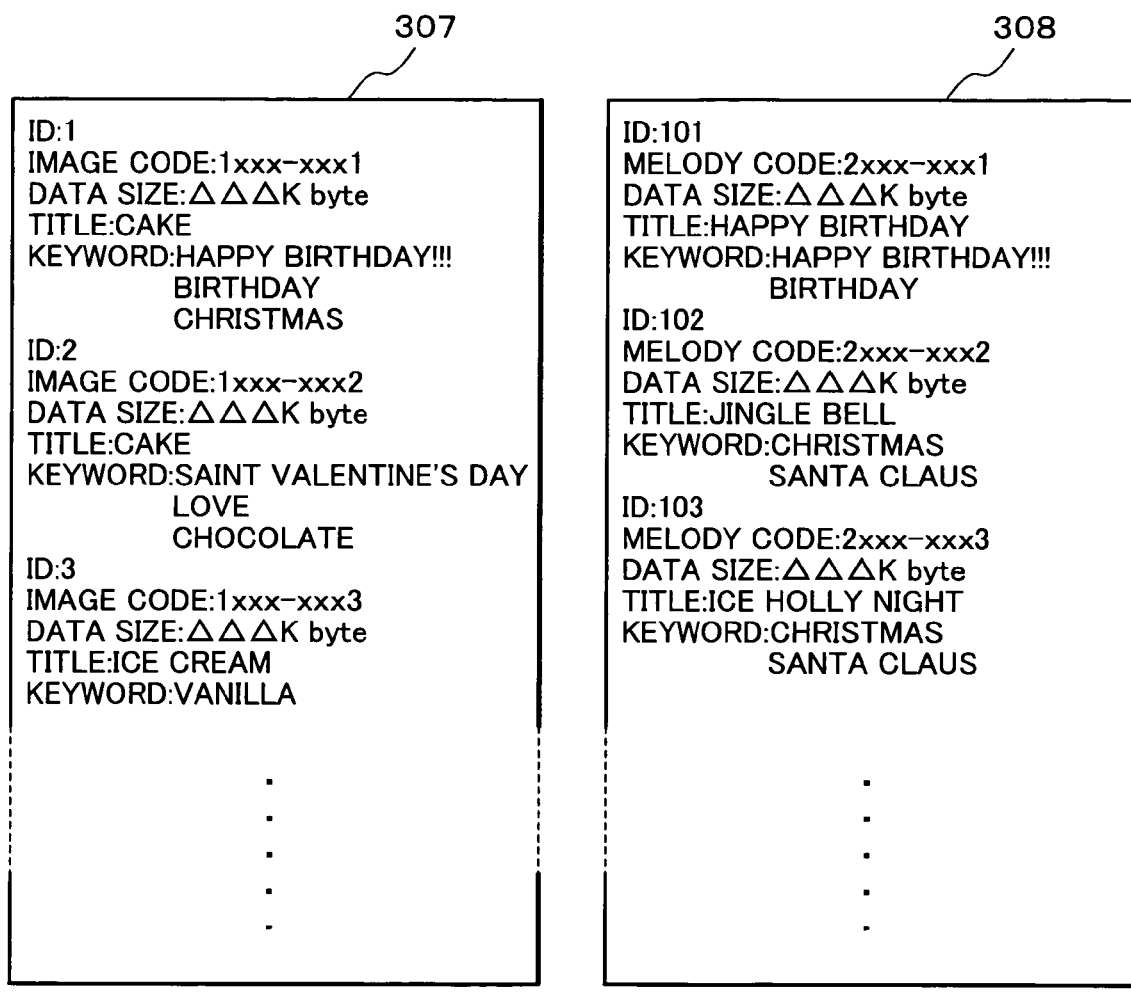
FIG. 3 is a view conceptually showing a data constitution example of an image library 307 and a melody library 308.

Herein, constitutions of the image library 307 and the melody library 308 will be described. FIG. 3 is a view conceptually showing a data constitution example of the image library 307 and the melody library 308.

The image library 307 and the melody library 308 are a data library (database) in which an ID (identification number) is given to each data (content) as shown in FIG. 3. The individual data (content) includes a data field such as a code (image code, melody code) showing this data, a data size of this data, a title of this data, and a keyword corresponding to this data. In the image library 307 and the melody library 308, data of each data field is linked (associated) to an individual content (image data, music data).

Each data (content) is previously set in the cellular phone 201 (203), and, in addition, data desired by the user can be registered therein. Such data desired by the user may be selected from the image (music) data stored in the my-data 303, for example. Furthermore, with respect to the keyword corresponding to each data, a plurality of keywords desired by the user can be set.

E-Mail Function 306

Next, characteristic operations of the e-mail function 306 executed in the foregoing device constitution will be described with reference to FIGS. 4 to 7. In the following descriptions, the entire operation realized by the e-mail function 306 is described, and thereafter the details of the processing by this function are described. Herein, FIGS. 6A to 6F are views showing for exemplifying and explaining a screen displayed on the display device 309 when the e-mail function 306 is executed.

In the cellular phone 201, the user starts up the e-mail function 306 by use of the manipulation device 305 when he/she writes (inputs) a body text of a message. At this time, the control circuit 301 (CPU 1) begins the execution of the software program of the e-mail function 306.

When the execution of the e-mail function 306 is begun, the user selects a message creating function by his/her predetermined manipulations. Then, by use of the manipulation, device 305, the user enters the body text of the message, which he/she wishes to transmit by the e-mail, to a message enter screen (see FIGS. 6A to 6B) displayed on the display device 309 in response to such selection manipulations.

The control circuit 301 monitors characters (character code) composing the body text of the message entered. Then, the control circuit 301 checks whether or not the detected character is concordant with a keyword stored in the image library 307 and the melody library 308.

When the keyword in concordance with the character is detected by the foregoing check, the control circuit 301 stores a position of the character, which is concordant with the keyword, in the body text of the message. Furthermore, the control circuit 301 reads out the image (melody) data corresponding to the keyword from the image (melody) library 307(308) as a specific content to be added to the body text of the message. Next, the control circuit 301 embeds the read-out image (melody) data in the vicinity of code data, for example, immediately behind the code data, which is concordant with this keyword, in the RAM 3 which temporarily stores the input body text of the message (a character code string).

Figure 6A:
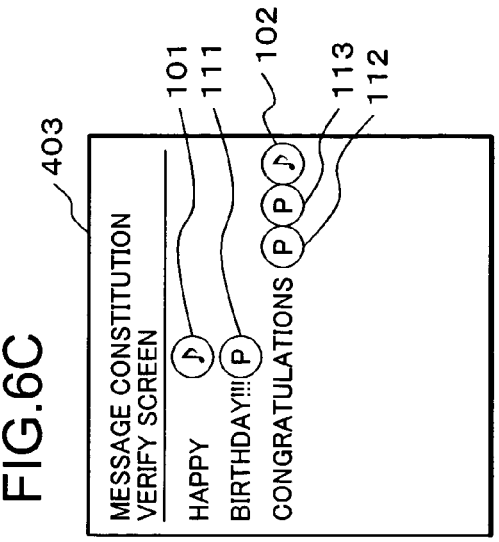
FIGS. 6A to 6F are views exemplifying and explaining a screen displayed on a display device 309 when an e-mail function is executed.
Figure 6B:
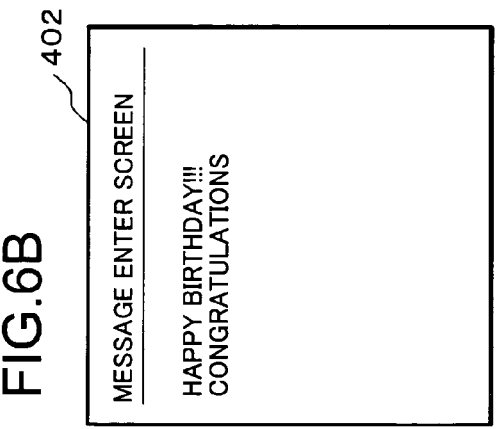
Figure 6C:
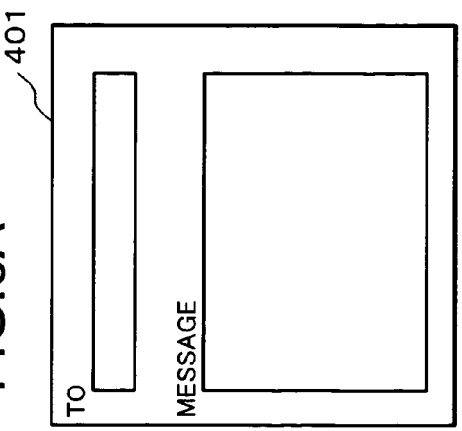

Furthermore, the control circuit 301 displays a predetermined symbol representing the image (melody) data next to the character, which is concordant with the keyword, on the message enter screen displayed in the display device 309 (see FIG. 6C). In FIG. 6C, the symbol expressed by "P" is displayed as the predetermined symbol representing the image data. And, the symbol expressed by "♪" is displayed as the predetermined symbol representing the melody data. According to the displayed symbol, the user can recognize that the image (melody) data corresponding to the keyword is input in the vicinity of the character, which is concordant with the keyword, in the body text of the message temporarily stored in the RAM 3.

Otherwise, the user can recognize the entire constitution of the message which has been created, on a preview screen. In response to the detection of the manipulation for selecting the preview function, the control circuit 301 displays a message preview screen (see FIGS. 6D and 6E) based on the message temporarily stored in the RAM 3 or the message read out from the my-data 303. At this time, on the display device 309, the control circuit 301 displays an image based on the image data which has been embedded in the character code composing the body text of the message together with the displayed character string of the body text of the message. At this time, the control circuit 301 outputs the melody based on the music data, which has been embedded in the character code composing the body text of the message, from the speaker 310.

Figure 6D:
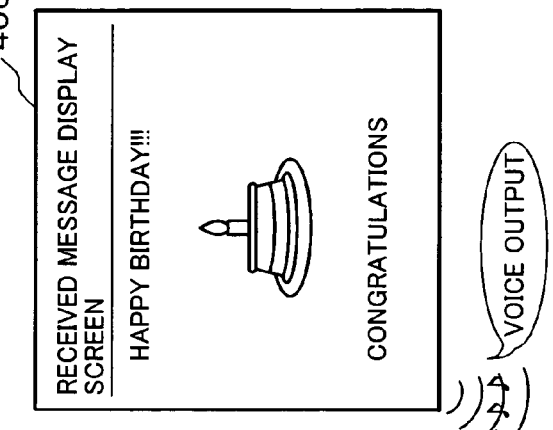
Figure 6E:
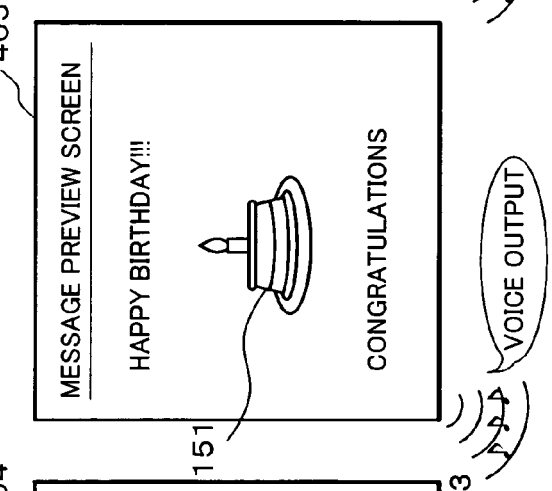
Figure 6F:
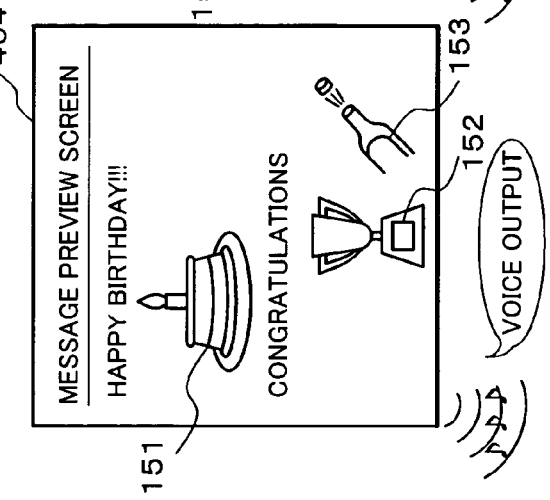

Herein, the ways of displaying and voice output, which the cellular phone 201 executes by such preview function, are basically the same as those of displaying and the voice output at the time when the contents of the message are verified (see FIG. 6F).

When the creating of the message is completed, the control circuit 301 checks a capacity (data size) of the inputted message. Specifically, when the capacity of the created message is larger than the transmittable upper limit value (maximum capacity) previously set, the control circuit 301 executes a processing to adjust the capacity of the message to the ranges within the upper limit value. This processing is executed, for example, by automatically deleting the image (melody) data which has been embedded in the message. Note that the control circuit 301 previously acquires this upper limit value from the message server 202 via a communication network (not shown).

Next, a processing which the CPU 1 of the control circuit 301 executes to realize the foregoing descriptions of the entire operation will be explained. In this exemplary embodiment, the e-mail function 306 has a mail creating and transmission processing (FIGS. 4 and 5), a mail reproduction processing (FIG. 7), and a mail reception processing (not shown), broadly. Among these processing, a general processing structure can be adopted for the mail reception processing, so that detailed descriptions for the mail reception processing are omitted in this embodiment.

Mail Creating and Transmission Processing

Figure 4:
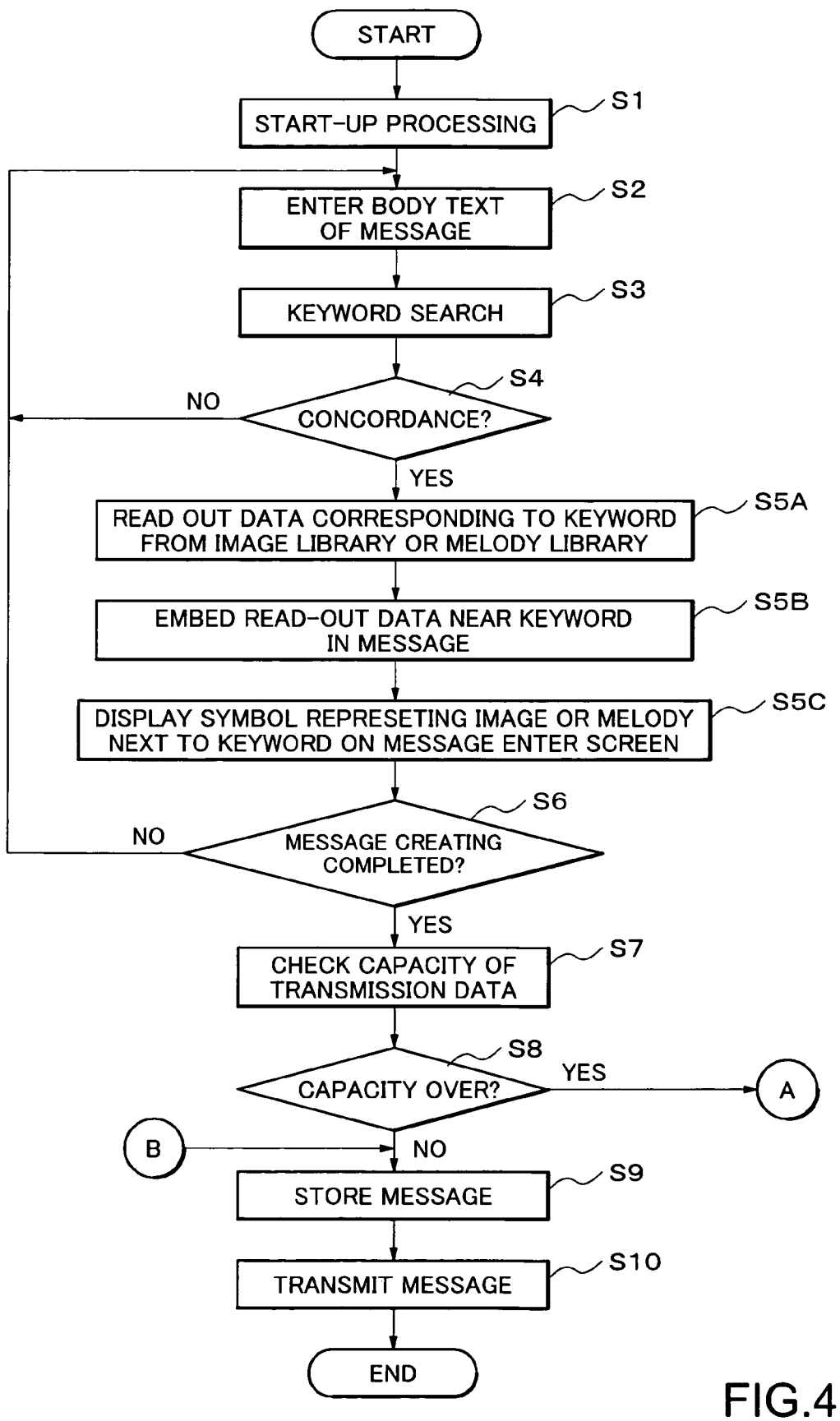
FIG. 4 is a flowchart showing mail creating and a transmission processing according to this exemplary embodiment.
Figure 5:
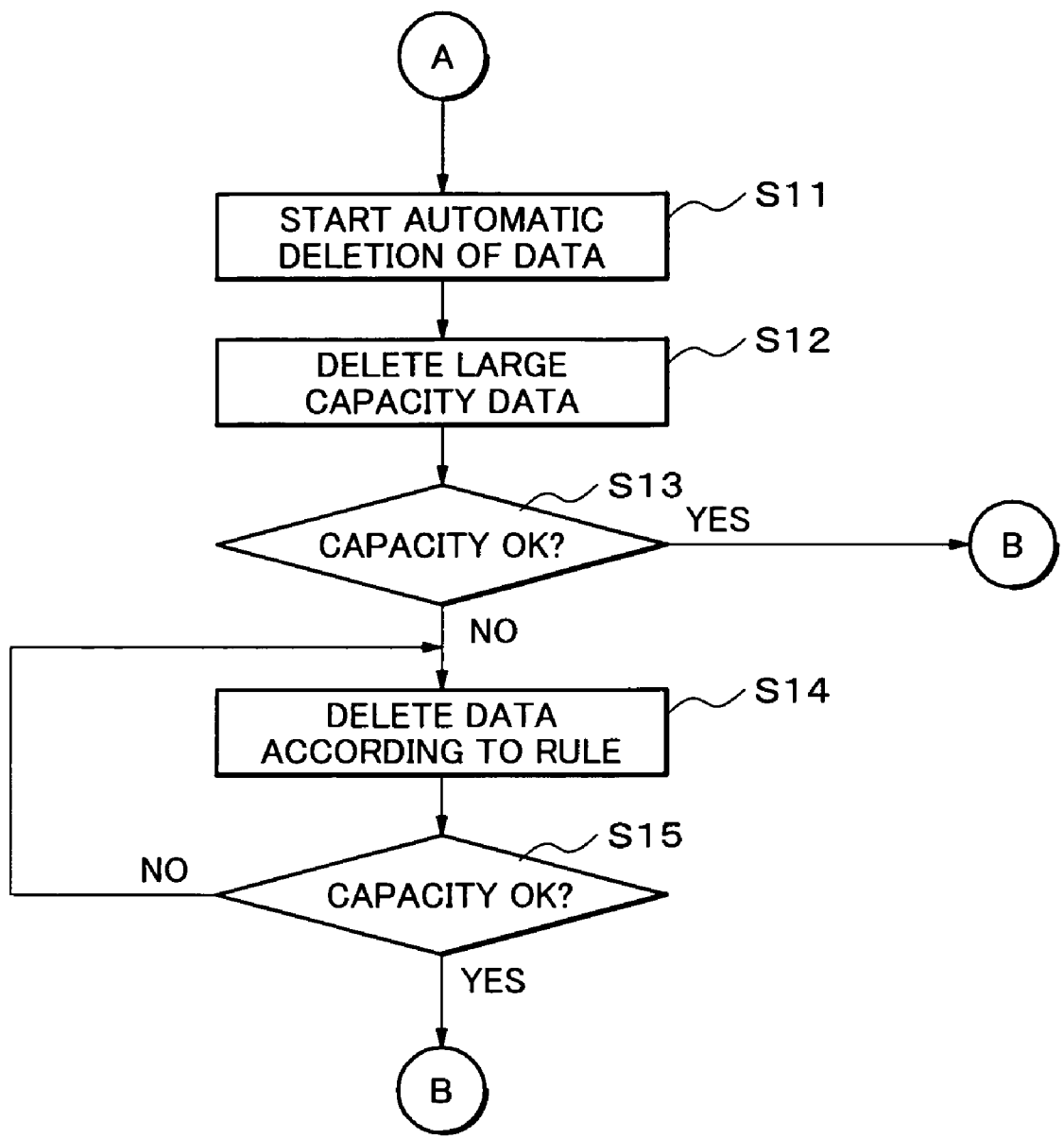
FIG. 5 is a flowchart showing mail creating and a transmission processing according to this exemplary embodiment.

FIGS. 4 and 5 are flowcharts showing mail creating and transmission processing according to this exemplary embodiment. The flowcharts show procedures of processing of a software program which the CPU 1 executes in the control circuit 301 of the cellular phone 201 shown in FIG. 2.

In the drawings, the CPU 1 of the control circuit 301 starts the mail creating and transmission processing in response to a detection of a predetermined manipulation by the user (Step S1). At this time, the CPU 1 allows the display device 309 to display the message enter screen 401 in an initial state shown in FIG. 6A. By use of the manipulation device 305, the user enters an address for specifying a party on the other end, to which the message is to be transmitted and a body text of a desired message on the message enter screen 401 by a text (character) (Step S2). Note that the party on the other end is the cellular phone 203 in this embodiment. The message enter screen 402 shown in FIG. 6B shows a display example of the display device 309 in a state where entering of the body text of the message by the user is completed.

Next, the CPU 1 extracts, from the characters (character code) composing the body text of the message entered in Step S2, a keyword to be used as a search key in Step S3 by referring to the dictionary 320. Then, the CPU 1 searches keyword groups stored in the image library 307 and the melody library 308 by use of the extracted keyword (Step S3).

Specifically, in this embodiment, as an example, the keyword search in Step S3 is executed after the entering of the body text of the message by the user has completed. Herein, as an example, descriptions for the case where the text body of the created message is expressed by "Happy Birthday!!!" will be made. In this case, in the keyword search, the CPU 1 extracts, by referring to the dictionary 320, "Happy", "Birthday", and "Happy Birthday" as keywords for search, respectively from the body text of the message. Next, by use of the extracted keywords as a search key, the CPU 1 searches a keyword in concordance with the keywords extracted from the body text of the message, in a keyword group stored in the image library 307 and the melody library 308.

The CPU 1 advances the processing to Step S5A when the CPU 1 detects keywords in concordance with the keywords extracted from the body text of the message, in the image library 307 and the melody library 308 in Step S3.

As described before, the CPU 1 executes the keyword search processing in Step S3 for each keyword extracted from the body text of the message. Note that, when the keyword in concordance with the keywords extracted from the body text of the message cannot be detected in the image library 307 and the melody library 308 (when NO decision is made in Step S4), the processing from Steps S5A to S5C are not executed.

The CPU 1 reads out image (music) data corresponding to the keyword in the image library 307 and the melody library 308, which hits (is concordant with) in the keyword search in Step S3 (Step S5A). The read out image (music) data is a specific content to be added to the body text of the message.

Next, in the RAM 3 in which the body text of the created message (character code string) is temporarily stored, the CPU 1 embeds the image (music) data read out in Step S5A in the vicinity of the code data of the character in concordance with the keyword. Herein, the words "in the vicinity of" means immediately after the code data of the character positioned at the tail in one character or the plurality of the characters composing the keyword, for example, in the body text of the message.

Furthermore, the CPU 1 displays a message constitution verify screen 403 in which predetermined symbols representing the image data (the symbol "P") and melody data (the symbol "♪") are added next to the character in concordance with the keyword, on the message enter screen displayed in the display device 309 (Step S5C). FIG. 6C is a view for exemplifying the message constitution verify screen 403. In FIG. 6C, the symbols "♪" 101 and 102 indicate that the melody data is embedded in the vicinity of the code data in Step S5B. On the other hand, the symbols "P" 111 to 113 indicate that the image data is put in the vicinity of the code data in Step S5B.

In accordance with the completion of a series of the foregoing processing (Step S6), the CPU 1 calculates a total capacity of the message data (the character code composing the message, the image data and the music data), which is temporarily stored in the RAM 103 (Step S7). Note that, with respect to the data sizes of the individual image and music data, a data field in the image library 307 and the melody library 308 corresponding thereto may be referred to.

The CPU 1 compares the data capacity of the message calculated in Step S7 with the upper limit value (maximum capacity) of the transmittable message size previously determined (Step S8):

When the data capacity of the message is judged to be smaller than the upper limit value in Step S8, the CPU 1 stores the message, for example, in the my-data 303 in the nonvolatile memory 312 so as to transmit the message (Step S9). Then, in response to the transmission instruction by the user, the CPU 1 edits the message stored in Step S9 as an e-mail to be transmitted, and thereafter transmits the message to the message server 202 via the radio communication circuit 302 (Step S10). Thereafter, the message server 202 which received the message transmits the message to the cellular phone 203 at the proper timing.

On the other hand, when the data capacity of the message is judged to be larger than the upper limit value in Step S8, the CPU 1 advances the processing to Steps S11 followed by Step 12 to Step S15 shown in FIG. 5.

Specifically, the CPU 1 begins the deletion of the image (music) data embedded in the Step S5B in accordance with a deletion rule previously determined, in order to satisfy the data capacity of the message within the upper limit value (Step S11). The CPU 1 deletes image (music) data having the largest capacity among the image (music) data embedded in the message (Step S12). Then, the CPU 1 compares the data size (total capacity) of the message after the execution of the deletion in Step S12 with the upper limit value (Step S13).

Next, when the data capacity of the message is judged to be smaller than the upper limit value in Step S13, the CPU 1 returns the processing to Step S9 (FIG. 4).

On the other hand, when the data capacity of the message is judged to be larger than the upper limit value yet in Step S13, the CPU 1 deletes the image (music) data embedded in the message yet, in accordance with the deletion rule previously determined (Step S14) To be more concrete, in Step S14, when it is set to prioritize the image data in the deletion rule, for example, the CPU 1 deletes one melody data having the largest data size among the pieces of melody data. Next, in Step S15, the CPU 1 performs a comparison of the data size as in the case of Step S13.

By repeating the Steps S14 and S15, when it is confirmed that the data size of the message is satisfied within the upper limit value (Yes Judgment in Step S15), the CPU 1 returns the processing to Step S9.

Mail Reproduction Processing

Next, descriptions for a mail reproduction processing will be made. This processing is for displaying the message (message on the RAM 2) which is being created by the foregoing mail creating and transmission processing (FIGS. 4 and 5) or the message stored in the my-data 303 in the nonvolatile memory 312 on the preview screen. The mail reproduction processing is executed also when the user confirms the message of the received e-mail in the cellular phone 203.

Figure 7:
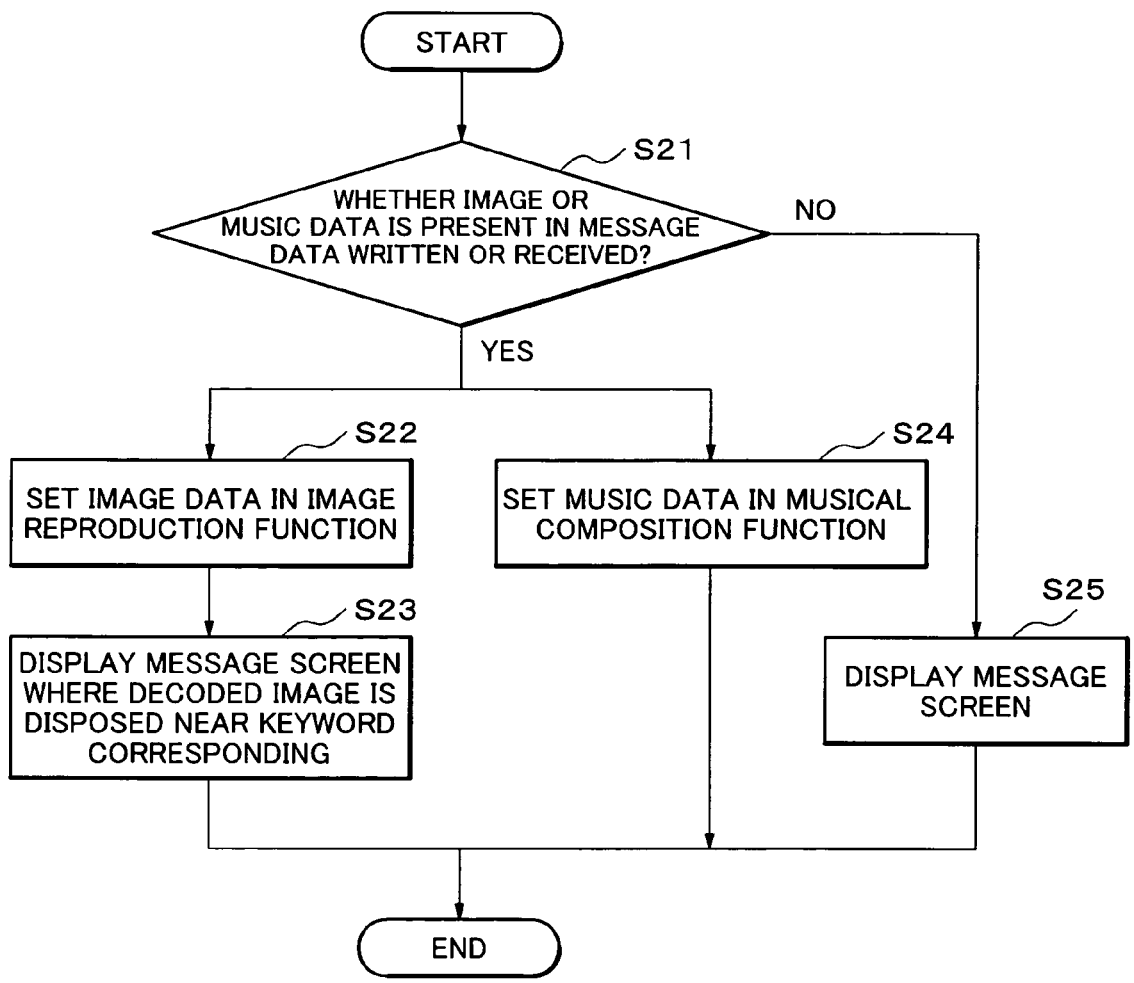
FIG. 7 is a flowchart showing a mail reproduction processing according to this exemplary embodiment.

FIG. 7 is a flowchart showing the mail reproduction processing according to this exemplary embodiment. The flowchart shows the procedures of the processing of a software program executed by the CPU 1 in the control circuit 301 of the cellular phone 201 shown in FIG. 2.

Specifically, in response to the detection of the manipulation for selecting the preview function, for the message temporary stored in the RAM 3 or the message read out from the my-data 303, the CPU 1 judges whether or not the image data or the music data is included in the data constituting the message (Step S21). Then, when it is judged in Step S21 that the image data is included therein, the CPU 1 advances the processing to the Step S22, and when it is judged that the music data is included therein, the CPU 1 advances the processing to Step S24. When it is judged that only the message is composed of only the character code the CPU 1 advances the processing to Step S25.

In order to reproduce the image data included in the message, the CPU 1 starts up a program module of the image reproduction function, and sets the image data in this function started up (Step S22). Since a commonly used program module can be adopted as the program module for realizing the image reproduction function, detailed descriptions for this program module are omitted in this embodiment.

The CPU 1 displays the image decoded in Step S22 on a preview screen (message screen) of the display device 309, which is disposed in the vicinity of the corresponding keyword in the character code composing the message (Step S23).

In order to reproduce the music data included in the message, the CPU 1 starts up the program module of the musical composition (music) function, and sets the music data in the musical composition (music) function started up (Step S24). Herein, since a commonly used program module can be adopted as the program module for realizing the musical composition function, detailed descriptions for this program module are omitted in this embodiment.

When it is judged in Step S21 that the message is composed of only the character code, the CPU 1 displays the preview screen (message screen) based on the character coded on the display device 309 (Step S25).

FIG. 6D is a view exemplifying and explaining the preview screen 404, which corresponds to the message constitution verify screen 403 shown in FIG. 6C. Specifically, the symbols illustrated on the message constitution verify screen 403 shown in FIG. 6C and the image illustrated on the preview screen 404 have the following correspondence.

Symbol 111: Image 151
Symbol 112: Image 152
Symbol 113: Image 153

At this time, the CPU 1 outputs melody (musical composition) corresponding to the symbols and 102 illustrated on the message constitution verify screen 403 from the speaker 310. Note that the order of reproduction of the pieces of the music data may be made settable.

FIG. 6E is a view exemplifying and explaining the preview screen 405. Note that this preview screen 405 shows a state after the music data 102 and the image data 152 and 153 have been properly deleted in a state shown on the preview screen 404 by Steps S21 to S25.

The cellular phone 203 receives the mail (message) sent out from the cellular phone 201. In the cellular phone 203, in response to the detection of the mail verify manipulation by the user, the CPU 1 in the control circuit 301 executes a processing approximately identical to the foregoing mail reproduction processing (FIG. 7), whereby the CPU 1 displays a received message on the display screen in the display device 309.

FIG. 6F is a view for exemplifying and explaining the received message display screen 406 displayed in the cellular phone 203 on the mail reception side. The ways of displaying and voice output of the received message display screen 406 are the same as those of displaying and the voice output in the foregoing preview screen 405. Specifically, on the received message display screen 406, the characters expressing "Happy Birthday!!!" and "Congratulation" and the image 151 on the preview screen 405, which is an image displaying a cake and corresponds to the symbol 111 displayed on the message constitution verify screen 403, are displayed. At this time, the speaker 310 outputs a melody corresponding to the symbol 101 displayed on the message constitution verify screen 403.

According to this exemplary embodiment described above, the unique message can be easily created by utilizing the function of the cellular phone 201 as the e-mail creating apparatus.

Specifically, in the cellular phone 201, the CPU 1 executes Steps S2 to S6 (FIG. 4) at the time of the creating of the message by the user. At this time, by use of a keyword included in the body text of the message inputted by the user as a search key, the CPU 1 first extracts the image (music) data (specific content) automatically corresponding to the keyword from the image library 307 and the melody library 308. Then, the CPU 1 automatically adds the extracted image (music) data to the body text of the message composed of the text (character) string entered by the user. Accordingly, by entering only the body text of the message, the user can easily create an unique and amusing message, which is one with an image and/or melody, without complicated manipulations.

Also, according to the foregoing embodiment, the user can easily adjust the capacity (data size) of the created message by utilizing the function of the cellular phone 201 as the e-mail creating apparatus.

Specifically, when the data capacity of the created message exceeds the maximum capacity (upper limit value) of the transmittable message previously determined, Steps S11 to S15 (FIG. 5) are executed in the cellular phone 201. Thus, the image data and the music data included in the message are automatically deleted according to the predetermined deletion rule until the data size of the message is satisfied within a range of the maximum capacity. Accordingly, the user can easily create unique message without constraint for the data size of the message when he/she creates the message.

Modification 1

In the foregoing embodiment, when the data capacity of the created message exceeds the maximum capacity previously determined, the constitution in which the added image (music) data is automatically deleted is adopted. However, the constitution is not limited to the above. For example, in the message constitution verify screen 403 exemplified in FIG. 6C, a constitution, in which a symbol (P, z,900) corresponding to image (music) data which the user wishes to delete is manually selected by moving a cursor, may be adopted. In this case, in comparison with the constitution of the foregoing embodiment in which the deletion is performed automatically, though the manipulation of the user becomes more complicated, a degree of freedom for the way of displaying the message created and the way of the voice output can be enhanced.

Modification 2

In the foregoing embodiment, the constitution is adopted, in which the image (music) data is added to all keywords in the body text of the message in putted by the user, which are searched by the keyword search (Step S3 in FIG. 4). However, the constitution is not limited to this, and a constitution in which the user can select a keyword to which the image (music) data is to be added maybe adopted, for example. To be more concrete, a constitution may be adopted, in which the user is allowed to recognize the presence of the image (music) data for the keyword in the message and the content of this image (music) data by use of the display device 309 and the like, and in which the user can properly select the keyword. This processing may be executed prior to reading-out of the image (music) data from the image library 307 and the melody library 308 in Step 5A. In this case, in comparison with the constitution of the foregoing embodiment in which all keywords are subjects for selection, though the manipulation of the user becomes more complicated, a degree of freedom for the way of displaying the message created and the way of the voice output can be enhanced.

Modification 3

In the foregoing embodiment, the constitution is adopted, in which after the message is created (Step S6), the data capacity of the message is checked (Step S7). However, the constitution is not limited to this. For example, a constitution may be adopted, in which prior to embedding of the image (music) data in the message data in Step S5B, the data capacity of the message is checked, and the embedding is executed if there is room in the data capacity thereof to embed the image (music) data therein. In this case, it is possible to omit the processing from Steps S11 to S15 (FIG. 5), in which the image (music) data once embedded is deleted after checking the data capacity. Accordingly, the constitution can be preferably simplified.

Also, in the foregoing embodiment, the constitution is adopted, in which the image (music) data embedded is deleted in order to keep the data capacity of the created message within the upper limit value. However, the constitution is not limited to this, and a constitution may be adopted, in which the total capacity of the message data is kept within the upper limit value by properly compressing the embedded image (music) data. In this case, in the cellular phone 203 on the reception side, the embedded image (music) data is decompressed (decoded) and then outputted as an image or voice when the message received is verified.

Modification 4

In the foregoing embodiment, the constitution is adopted, in which the keyword search is executed for the character (text) string composing the body text of the message by referring to the dictionary 320 in Step S3. However, the constitution is not limited to this, and a constitution may be adopted, in which it is judged by use of the keyword group registered in the image library 307 and the melody library 308 as the search key whether or not a character string in concordance with keys in the keyword group is present in the character (text) string composing the body text of the message. In this case, since it is satisfactory to execute the search processing once, which is executed twice in the foregoing embodiment, the constitution can be simplified.

Modification 5

The constitution is adopted in the foregoing embodiment, in which by embedding the image (music) data in the vicinity (for example, immediately after) of the character string corresponding to the keyword in the character (text) string composing the body text of the message entered by the user, the image (music) data is added to the message. However, the constitution is not limited to this, and a constitution may be adopted, in which the image (music) data is added in the front of or after the character (text) string composing the body text of the message. In this case, it is unnecessary to execute a data rearrangement (displacement) processing within the RAM 3, which is necessary when the image (music) data is embedded in the body text of the message. Therefore, in comparison with the foregoing embodiment, the constitution in this modification 5 is preferred since it can shorten a time required for completion of the message creating.

Modification 6

In the foregoing embodiment, the image (music) data is read out from the image library 307 and the melody library 308 in Step S5A, Furthermore, in the foregoing embodiment, the constitution is adopted, in which after the image (music) data read out is added to the character (text) string (Step S5B), the data size is checked (Step S7). However, the constitution is not limited to this.

For example, in Step S5A of this modification, without reading out the image (music) data from the image library 307 and the melody library 308, linking (association) of the image (music) data corresponding to the keyword in the body text of the message is executed. On the other hand, in Steps S7, S13 and S15, the data size is checked by referring to a data size field in the image library 307 and the melody library 308, and data showing the linking is properly deleted when the data size exceeds a predetermined upper limit value. Then, in Step S10, at the time when a state where the data size of the message including the image (music) data is kept within the upper limit value is brought about, image (music) data which remains linked is first read out from the image library 307 and the melody library 308. Furthermore, a constitution may be adopted, in which in Step S10, by adding read-out contents to the body text of the message, the contents are set up as an e-mail to be transmitted.

In this case, in comparison with the constitutions in the foregoing embodiment, the constitution in this modification 6 is preferred since the constitution in the modification 6 can shorten a time required for completion of the message creating including the image (music) data.

Modification 7

In the foregoing embodiment, the constitution is adopted, in which the image (music) data is actually added to the character (text) string composing the body text of the message. However, the constitution is not limited to this. For example, when the cellular phone 203, which is a party on the other end, has a specification common to the cellular phone 201 on the sending end, and/or when the cellular phones 201 and 203 execute communications through a common carrier, IDs (image code, melody code) corresponding to them may be transmitted instead of transmitting image (music) data between them. In this case, in comparison with the case where the image (music) data is actually transferred between the cellular phones 201 and 203, a communication time can be shortened. Furthermore, in the cellular phone 201 on the sending side, processing time can be shortened by the time from reading out the image (music) data from the image library 307 and the melody library 308 to the addition of the read-out image (music) to the body text of the message.

Modification 8

In the foregoing embodiment, the case where the image library 307 and the melody library 308 are present in the nonvolatile memory 312 which is a built-in memory of the cellular phone 201 is described as an example. However, the constitution is not limited to this. For example, the image library 307 and the melody library 308 may be located in an external device (for example, a server computer on the Internet), and the like of the cellular phone 201. Alternatively, referable content libraries may be disposed inside the nonvolatile memory 312 and in the external device, respectively. Generally, since a built-in memory of a cellular phone imposes a limitation to its storage capacity, sorts of contents to be stored are restricted. On the contrary, when a system constitution capable of referring to a content library provided in an external device from the cellular phone 201 is adopted, a wide variety of contents can be available in creating a message. Accordingly, if such system constitution is adopted, more unique and greatly diversified messages can be easily created in comparison with the case where only a built-in memory (nonvolatile memory 312) is referred to.

In the foregoing embodiment, the case where the present invention is applied to the cellular phone which is a typical portable terminal is described. However, the scope where the present invention can be applied is not limited to this, and the present invention can be applied to, for example, an information processing device such as PDA (Personal Digital Assistant) having a communication function with external devices. Furthermore, the present invention can be applied also to an information processing device such as a stationary personal computer having a communication function with external devices.

Furthermore, in the foregoing embodiment, the case where the image data and the music (melody) data are added to the body text of the message is described as an example. Nevertheless, the present invention is not limited to such content. For example, the character string may be used as a content which is to be added. In this case, the added character string can be utilized for a parenthetic explanation and a comment for a keyword in the body text of the message.

The present invention described in the foregoing embodiment and the modifications can be achieved in the following manner. Specifically, after the computer program which can realize the functions of the flowcharts (FIGS. 4, 5 and 7) referred to for the description thereof is supplied to the foregoing cellular phones 201 and 203, the computer program is read out on the CPU 1 of the device to be executed. The computer program supplied to the device may be stored in a storage device such as the readable memory 312.

In the foregoing case, a method of supplying the computer program to the device can adopt general procedures nowadays at the stage of manufacturing before shipment or at the stage of maintenance after shipment, as in the case of a method of installing the computer program in the device by use of a proper tool, and a method of downloading the computer program from the outside through a communication line such as the Internet. In such case, the present invention is constituted by codes of such computer program or a storage medium.

While this invention has been described in connection with certain exemplary embodiments, it is to be understood that the subject matter encompassed by way of this invention is not limited to those specific embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. An e-mail creating apparatus which creates a message of an e-mail, comprising:
   a library which stores a content and a keyword representing the content in a state where the content and the keyword are associated with each other;
   a processor for executing search means for referring to the library which stores a content and a keyword representing the content in a state where the content and the keyword are associated with each other, and searching, in the library, a specific content associated with the keyword corresponding to at least a part of a character string comprising an inputted body text of the message; and
   addition means for adding the specific content searched by said search means to the body text of the message,
   wherein said addition means includes deletion means which deletes the specific content to be added based on a predetermined rule when a data size, in a case where the specific content searched by said search means is added to the character string comprising the body text of the message, is larger than a predetermined upper limit value.

2. The apparatus according to claim 1, wherein said search means comprises:
   first extraction means for extracting a second keyword, which is different from a first keyword as the keyword corresponding to at least a part of a character string comprising the inputted body text of the message, used as a search key out of the character string comprising the body text of the message by referring to a dictionary file; and
   second extraction means for searching the library by use of the second keyword extracted by said first extraction means as a search key, thus extracting the content associated with the first keyword as the specific content to be added to the body text of the message, when the second keyword and the first keyword stored in the library are concordant with each other.

3. The apparatus according to claim 1, wherein said search means searches the character string comprising the body text of the message by use of the first keyword stored in the library as a search key, and said search means extracts the specific content corresponding to the first keyword as a content to be added to the body text of the message when a specific character in concordance with the first keyword is detected in the character string.

4. The apparatus according to claim 1, wherein, when the content searched by said search means is added, said addition means embeds the content in a vicinity of a character in concordance with the first keyword associated with the specific content, among the character string comprising the body text of the message.

5. The apparatus according to claim 1, wherein said addition means adds the specific content searched by said search means in front of the character string comprising the body text of the message or after the character string comprising the body text of the message.

6. The apparatus according to claim 1, wherein, when a data size including the body text of the message and the specific content to be added yet after deletion by said deletion means becomes smaller than the predetermined upper limit value, said addition means reads out the specific content from the library and makes up an e-mail to be transmitted by adding the read-out specific content to the body text of the message.

7. The apparatus according to claim 1, wherein the specific content comprises at least one of image data, music data and text data.

8. The apparatus according to claim 1, wherein the library is provided in the apparatus itself.

9. The apparatus according to claim 1, wherein said search means refers to the library as provided in an external device.

10. The apparatus according to claim 1, further comprising:
    display means for displaying, as a message constitution in a case where the specific content is added by said addition means, a display screen in which a predetermined symbol representing the specific content is disposed in the vicinity of the character corresponding to the content in the body text of the message.

11. A portable terminal including an e-mail creating apparatus which creates a message of an e-mail, said e-mail creating apparatus comprising:
    a library which stores a content and a keyword representing the content in a state where the content and the keyword are associated with each other;

a processor for executing search means for referring to the library which stores a content and a keyword representing the content in a state where the content and the keyword are associated with each other, and searching, in the library, a specific content associated with the keyword corresponding to at least a part of a character string comprising an inputted body text of the message; and addition means for adding the specific content searched by said search means to the body text of the message, wherein said addition means includes deletion means which deletes the specific content to be added based on a predetermined rule when a data size, in a case where the specific content searched by said search means is added to the character string comprising the body text of the message, is larger than a predetermined upper limit value.

12. An e-mail creating apparatus which creates a message of an e-mail, comprising:

a control circuit which refers to a library in which a content and a keyword representing the content are stored in a state where the content and the keyword are associated with each other and searches, in the library, a specific content associated with the keyword corresponding to at least a part of a character string comprising an inputted body text of the message; and deletion means which deletes the specific content based on a predetermined rule when a data size, in a case where the specific content searched is added to the character string comprising the body text of the message, is larger than a predetermined upper limit value.

13. A portable terminal including an e-mail creating apparatus which creates a message of an e-mail, said e-mail creating apparatus comprising:

a control circuit which refers to a library in which a content and a keyword representing the content are stored in a state where the content and the keyword are associated with each other and searches, in the library, a specific content associated with the keyword corresponding to at least a part of a character string comprising an inputted body text of the message; and deletion means which deletes the specific content based on a predetermined rule when a data size, in a case where the specific content searched is added to the character string comprising the body text of the message, is larger than a predetermined upper limit value.

14. A method of creating a message of an e-mail, said method comprising:

referring to a library which stores a content and a keyword representing the content in a state where the content and the keyword are associated with each other, thus searching, in the library, a specific content associated with the keyword corresponding to at least a part of a character string comprising an inputted body text of the message; and adding the specific content searched by said searching to the body text of the message, wherein said adding includes deleting the specific content to be added based on a predetermined rule when a data size, in a case where the specific content searched by said searching, is added to the character string comprising the body text of the message, is larger than a predetermined upper limit value.

15. The method according to claim 14, said searching further comprising:

extracting a second keyword, which is different from a first keyword as the keyword corresponding to at least a part of a character string comprising the inputted body text of the message, used as a search key out of the character string comprising the body text of the message by referring to a dictionary file; and searching the library by use of the second keyword extracted as a search key, whereby the content associated with the first keyword as the specific content to be added to the body text of the message, when the second keyword and the first keyword stored in the library are concordant with each other.

16. The method according to claim 14, wherein, in said searching, the character string comprising the body text of the message is searched by use of the first keyword stored in the library as a search key, and, when a specific character in concordance with the first keyword is detected in the character string comprising the body text of the message, the content corresponding to the first keyword is extracted as the specific content to be added to the body text of the message.

17. The method according to claim 14, wherein, in said addition, when the content searched in said searching is added, the content is embedded in a vicinity of a character in concordance with the first keyword associated with the specific content, among the character string comprising the body text of the message.

18. The method according to claim 14, wherein, in said addition, the specific content searched by said searching is added in front of the character string comprising the body text of the message or behind the character string comprising the body text of the message.

19. The method according to claim 14, wherein the specific content is at least any one of image data, music data and text data.

20. A computer-readable storage medium embodying a program of machine-readable instructions when executed by a digital processing apparatus, said program controlling an operation of an e-mail creating apparatus for creating a message of an e-mail, wherein the program allows a computer to implement:

a search function which searches, by referring to a library which stores a content and a keyword representing the content in a state where the content and the keyword are associated with each other, a specific content associated with the keyword corresponding to at least a part of a character string comprising an inputted body text of the message; and an addition function which adds the specific content searched by said search function to the body text of the message, wherein said addition function includes a deletion function which deletes the specific content to be added based on a predetermined rule when a data size, in a case where the specific content searched by said search function is added to the character string comprising the body text of the message, is larger than a predetermined upper limit value.

21. An e-mail creating apparatus which creates a message of an e-mail, comprising:

a processor for executing a searcher which refers to a library which stores a content and a keyword representing the content in a state where the content and the keyword are associated with each other, and searches, in the library, a specific content associated with the keyword corresponding to at least a part of a character string comprising an inputted body text of the message; and an adder which adds the specific content searched by said searcher to the body text of the message; and wherein said adder includes a deletion unit which deletes the specific content to be added based on a predetermined rule when a data size, in a case where the specific content searched by said searcher is added to the character string comprising the body text of the message, is larger than a predetermined upper limit value.

22. A portable terminal including:
an e-mail creating apparatus which creates a message of an e-mail, said e-mail creating apparatus comprising:
a processor for executing a searcher which refers to a library which stores a content and a keyword representing the content in a state where the content and the keyword are associated with each other, and searches, in the library, a specific content associated with the keyword corresponding to at least a part of a character string comprising an inputted body text of the message; and
an adder which adds the specific content searched by said searcher to the body text of the message,
wherein said adder includes a deletion unit which deletes the specific content to be added based on a predetermined rule when a data size, in a case where the specific content searched by said searcher is added to the character string comprising the body text of the message, is larger than a predetermined upper limit value.

23. The apparatus according to claim 1, wherein said deletion means comprises operation means which allows a user to select a desired content as the specific content to be deleted.

24. The apparatus according to claim 2, wherein said first extraction means comprises operation means which allows a user to select a desired word as the second keyword from the character string composing the body text of the message.

25. The apparatus according to claim 1, wherein said addition means adds identification information (ID) corresponding to the specific content instead of an actual specific content, when an external apparatus which is to receive the message and said apparatus have at least one of a specification in common and the message is transmitted through a common carrier between the external apparatus and said apparatus.

26. The apparatus according to claim 7, wherein said addition means adds identification information (ID) corresponding to the specific content instead of an actual specific content, when an external apparatus which is to receive the message and said apparatus have at least one of a specification in common and the message is transmitted through a common carrier between the external apparatus and the own apparatus.

\* \* \* \* \*